June 16, 1953     C. E. DEARDORFF     2,642,299
SELF-LOCKING ADJUSTABLE ROD COLLAR
Filed Jan. 3, 1949
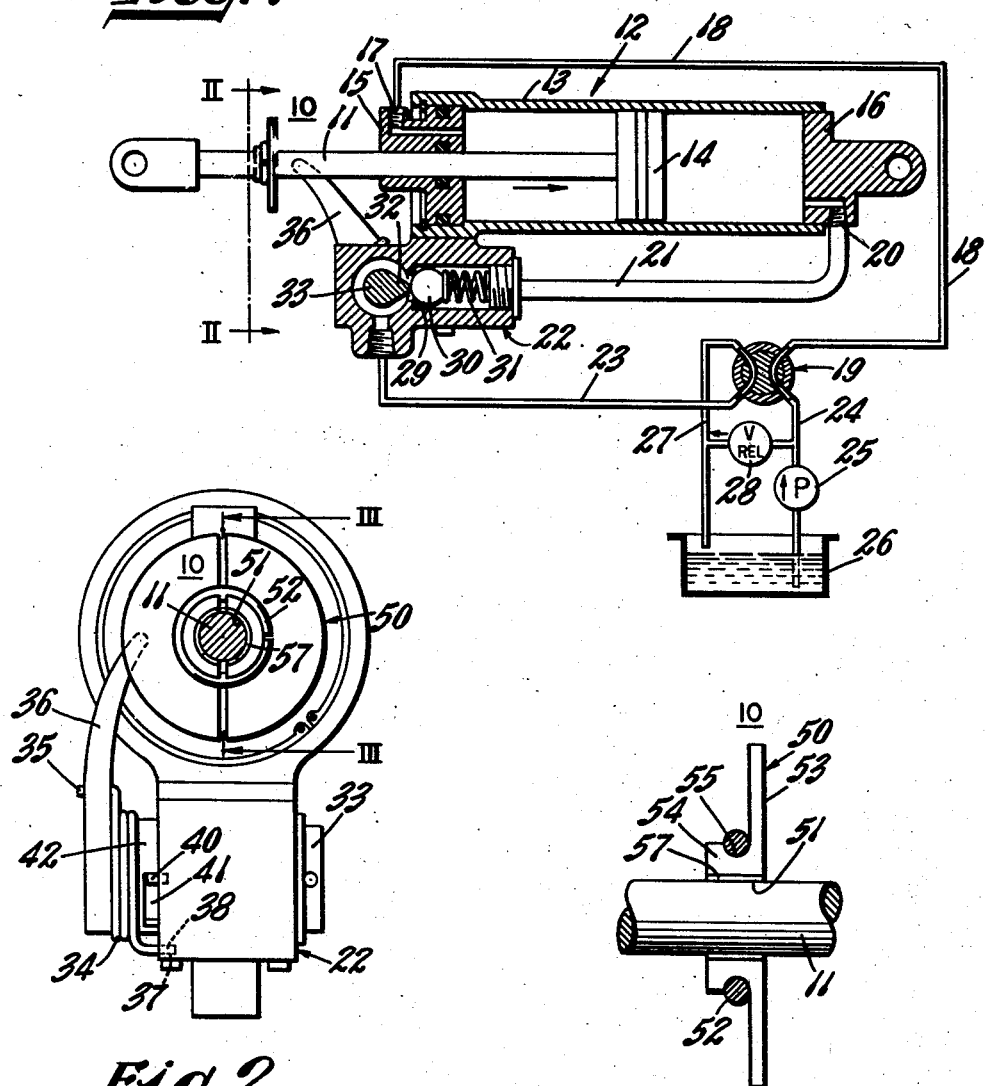
INVENTOR
C. E. DEARDORFF
BY
ATTORNEY Patented June 16, 1953

2,642,299

UNITED STATES PATENT OFFICE 2,642,299

SELF-LOCKING ADJUSTABLE ROD COLLAR

Clinton E. Deardorff, San Fernando, Calif., assignor to Bendix Aviation Corporation, South Bend, Ind., a corporation of Delaware Application January 3, 1949, Serial No. 68,785

4 Claims. (Cl. 287—52.03)

This invention relates to collars adapted to be mounted on rods for engaging and tripping valve switches or the like when the rod moves into a predetermined position.

An object of the invention is to provide a simple and practicable self-locking adjustable rod collar.

Another object is to provide a self-locking adjustable rod collar that reliably grips the rod during normal operation but can be readily moved along the rod for adjustment of its longitudinal position.

Another object is to provide a self-locking adjustable collar that cannot injure the surface of the rod on which it is used.

Other more specific objects and features of the invention will become apparent from the description to follow:

Essentially, the self-locking adjustable rod collar of the present invention comprises a plurality of segments (preferably two) having rod-contacting, cylindrically curved, concave surfaces of the same radius as that of the rod upon which it is to be used, which segments are urged into contact with the rod by a spring that encircles flanges on the segments. The segments have actuating skirt portions extending radially a substantial distance from the concave rod-contacting surfaces, one of which skirt portions contacts the actuating arm of the valve, switch, or the like to be controlled, the arrangement being such that the arm to be actuated is contacted by a portion of the skirt near its periphery. Under these conditions, the force exerted by the arm against the skirt tends to cock the collar on the rod, and increases the binding force, to prevent slippage of the collar along the rod. On the other hand, the collar can be readily moved along the rod for adjustment purposes by pressing at opposite diametrical points along the collar so that no cocking force is produced.

I am aware that it is old to employ rigid collars adapted to bind on a rod in response to a cocking force. The present invention differs from these prior structures in having spring-pressed segments, and in the use, for the rod-contacting surfaces of the collar segments, of a non-metallic material, such as brake lining, that is substantially softer than the rod on which the collar is used. The soft surface prevents any possibility of injury to the rod. Furthermore, by virtue of the fact that the collar surfaces are spring-pressed into direct engagement with the rod over their entire areas, there is no actual cocking of the collar on the rod, the binding force being produced in response to a cocking force without appreciable actual cocking of the collar.

In the drawing:

Fig. 1 is a view, partly schematic and partly in section, showing a collar in accordance with the invention used on the piston rod of a hydraulic jack for actuating a stroke-limiting valve on the jack.

Fig. 2 is an end elevation view of a collar in accordance with the invention, the view being taken in the line II—II of Fig. 1; and Fig. 3 is a view partly in section, taken along the line III—III of Fig. 2.

Referring first to Fig. 1, a collar 10 in accordance with the invention, is mounted on the piston rod of a hydraulic jack 12, the latter consisting of a cylinder 13 and a piston 14. The piston rod 11 extends through a cylinder head 15. The opposite end of the cylinder 13 is closed by a head 16. The cylinder head 15 is provided with a fluid port 17 that is connected by a line 18 to a 4-way valve 19. The cylinder head 16 has a port 20 connected by a pipe 21, a valve 22, and a line 23 to the 4-way valve 19. The valve 19 is also connected by a line 24 to the output of a pump 25, the inlet of which is connected to a supply of liquid in a reservoir 26. An exhaust line 27 extends from the valve 19 to the reservoir 26, and a relief valve 28 may be connected between the lines 24 and 27.

The valve 22 comprises a casing having a valve seat 29 adapted to be closed by a ball valve 30 urged toward the seat 29 by a helical compression spring 31 except when the ball is held off its seat by a cam 32 on a cam shaft 33 which is rotatably supported in bearings in the valve 22. As best shown in Fig. 2, the cam shaft 33 projects from opposite ends of the casing of valve 22 and is urged into the position shown in Fig. 1 by a torsion spring 34 which encircles one end of the shaft 33 and has one end 35 curled around an arm 36 and has its other end 37 hooked into a hole 38 provided in the wall of the valve casing. The angular movement of the shaft 33 and cam 32 is limited by a stop pin 40 that extends from the wall of the valve 22 into an arcuate slot 41 in the hub 42 of the arm 36. When the arm 36 is free, as shown in Fig. 1, the spring 34 maintains the camshaft 33 in one angular end position in which the cam 32 opens the ball valve 30. However, by applying a force to the arm 36, the latter can be rocked against the force of the spring 34 sufficiently to carry the cam 32 out of contact with the ball valve 30 permitting the latter to seat against the seat 29.

With the 4-way valve 19 positioned as shown in Fig. 1, the pump 25 delivers the fluid through the line 18 and the port 17 into the left end of the cylinder 13, moving the piston 14 and the piston rod 11 to the right. At the same time, fluid in the right end of the cylinder 13 is exhausted through the port 20, the pipe 21, the valve 22 and line 23 back through the said valve 19 through the exhaust line 27 into the reservoir 26. This motion continues until the movement of the piston rod 11 carries the collar 10 into engagement with the arm 36 and rocks the latter to carry the cam 32 out of engagement with the ball valve 30, whereupon the latter is seated by the spring 31 and by pressure of fluid in the pipe 21 to block further exhaust of fluid from the right end of the cylinder 13 and thereby stop the piston. However, the movement of the piston can be reversed at any time by manipulating the valve 19 so as to connect the pump output line 24 to the line 23, and connect the exhaust line 27 to the line 18. Fluid from the pump can then flow through the pipe 23 and through the valve 22 by simply lifting the ball valve 30 off its seat 29.

Various types of collars can be employed on the rod 11 to actuate the arm 36. However the special collar constituting the present invention has the advantages over prior known collars that it can be adjusted longitudinally along the rod 11 without the use of any tools, cannot damage the surface of the rod 11, and remains effective whether the rod 11 is dry or oily.

As best shown in Figs. 2 and 3, the collar 10 comprises two identical segments 50, each having a rod contacting surface 51 of some soft non-metallic material such as Vellumoid, Fairprene, impregnated cork, impregnated asbestos. The surface 51 on each of the elements 50—50 is substantially semi-cylindrical in extent, and dimensioned to have the same radius as the rod 11 on which it is to be used.

Each segment 50 comprises a thin, relatively flat skirt member 53 and a hub element 54 projecting from one side thereof and having in its exterior surface a circumferentially extending groove 55 in which a split spring ring 52 is positioned. The ring 52 is normally of smaller dimensions than the hub sections 54 so that it urges the inner surfaces 51 thereof snugly against the rod 11. The lining 57 may be cemented or bonded in any desired manner to the inner surface of the segments 50, the latter usually being of metal, although they can be made of any material having the required strength.

It has been found that with the construction described, substantial axial force can be applied to the skirt of either of the segments 50 near the outer edge thereof without shifting the collar along the rod. Although the collar is prevented from actually cocking on the shaft 11 by virtue of the fact that the inner surfaces 51 of the segments are at all times maintained in full engagement with the surface of the rod by the spring 52, nevertheless, an axial force applied to a single point on one of the segments 50 tends to cock the collar on the rod and substantially increase the resistance to sliding movement along the rod.

However, when it is desired to shift the collar 10 along the rod 11 for the purpose of changing the point in the stroke of the piston 14 where the valve 30 is closed, such movement can be easily produced by pressing with the fingers against the segments 50—50 at diametrical points thereon so that no cocking force is produced.

Although various numbers of segments 50 can be employed, the use of two segments each substantially 180° in arcuate extent has been found to be the simplest and the most satisfactory. If a larger number of segments are employed, each segment is of course of correspondingly reduced arcuate extent.

Although for the purpose of explaining the invention, a particular embodiment thereof has been shown and described, obvious modifications will occur to a person skilled in the art, and I do not desire to be limited to the exact details shown and described.

I claim:

1. An adjustable self-locking collar adapted for use on a cylindrical rod, said collar comprising: a plurality of similar segments, each segment consisting of a hub portion and a skirt portion, each hub portion having cylindrically curved inner and outer surfaces and flat end surfaces, and having axial thickness comparable to its radial thickness, and each skirt portion being substantially thinner axially and substantially thicker radially than the hub portion and joined at its inner edge to the outer edge of said hub portion; and spring means engaging said hub portions of said segments and urging them radially inwardly; the inner surfaces of said hub portions having the same radius of curvature as the cylindrical rod for which the collar is adapted.

2. A collar according to claim 1 in which said concave surfaces are of a material softer than said rod.

3. A collar according to claim 1 in which said concave surfaces are of a non-metallic material substantially softer than said rod.

4. A collar according to claim 1 in which said spring means comprises an annular spring element encircling the hub portions of said segments.

CLINTON E. DEARDORFF.

References Cited in the file of this patent

UNITED STATES PATENTS

| Number | Name | Date |
|---|---|---|
| 1,023,419 | Dewey | Apr. 16, 1912 |
| 1,038,085 | Chubbuck | Sept. 10, 1912 |
| 1,201,863 | Orey | Oct. 17, 1916 |
| 2,201,876 | Zimmerman | May 21, 1940 |